Oct. 11, 1949.
J. W. DAVIS
2,484,689
MATERIAL UNLOADING AND CONVEYING MECHANISM FOR TRUCKS
Filed June 16, 1945
5 Sheets-Sheet 1
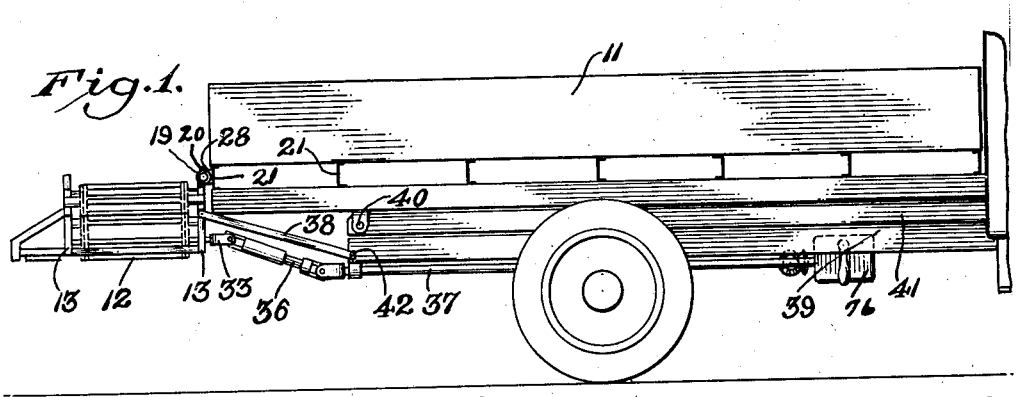
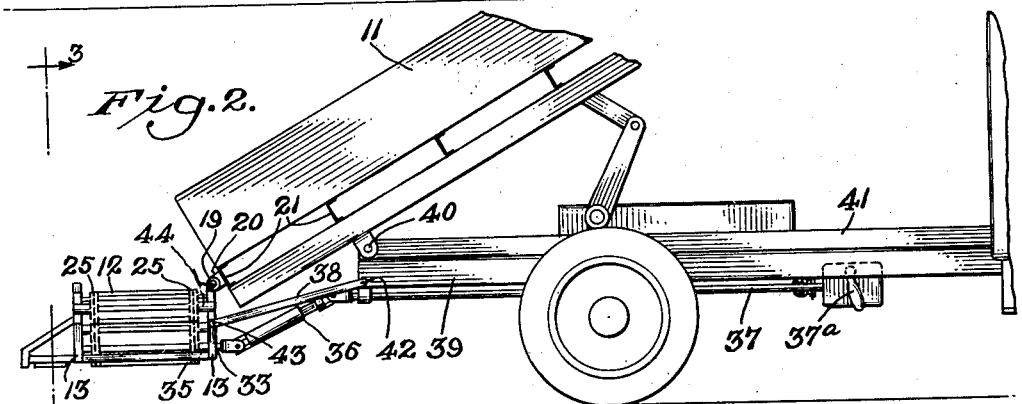
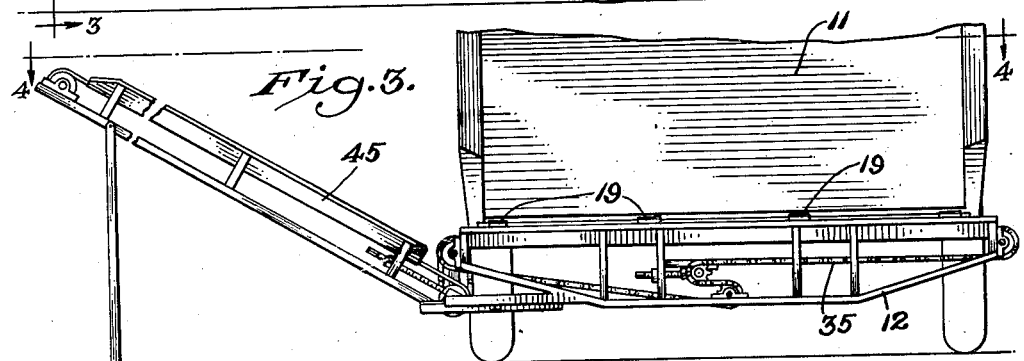
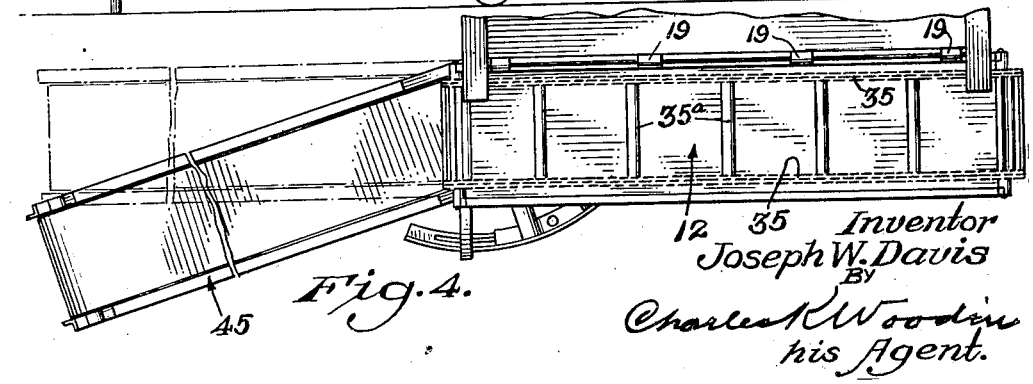
Inventor
Joseph W. Davis
BY
Charles R. Wooden
his Agent.

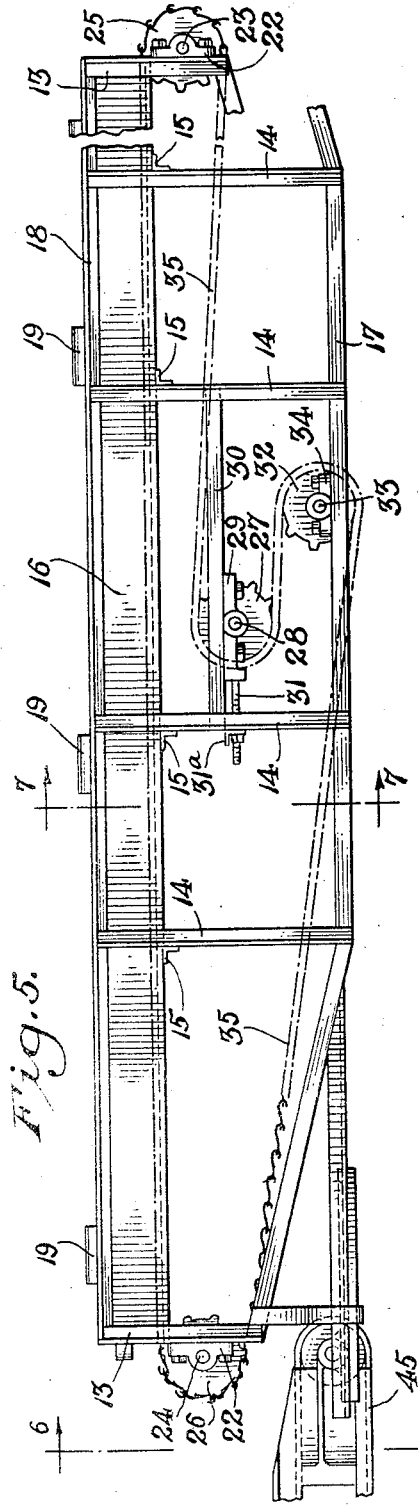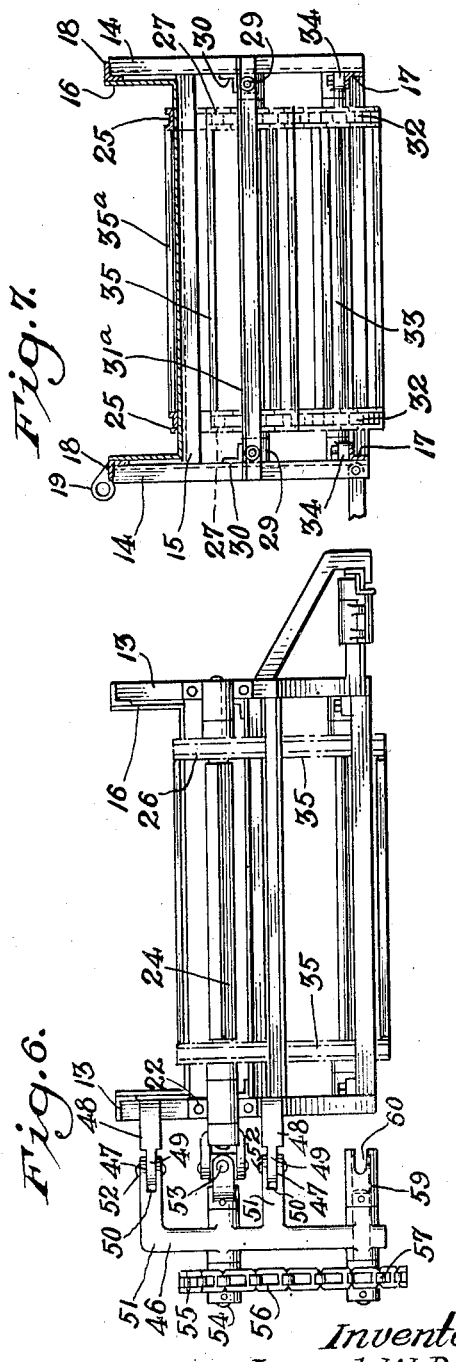

Oct. 11, 1949.
J. W. DAVIS
2,484,689
MATERIAL UNLOADING AND CONVEYING
MECHANISM FOR TRUCKS
Filed June 16, 1945
5 Sheets-Sheet 3
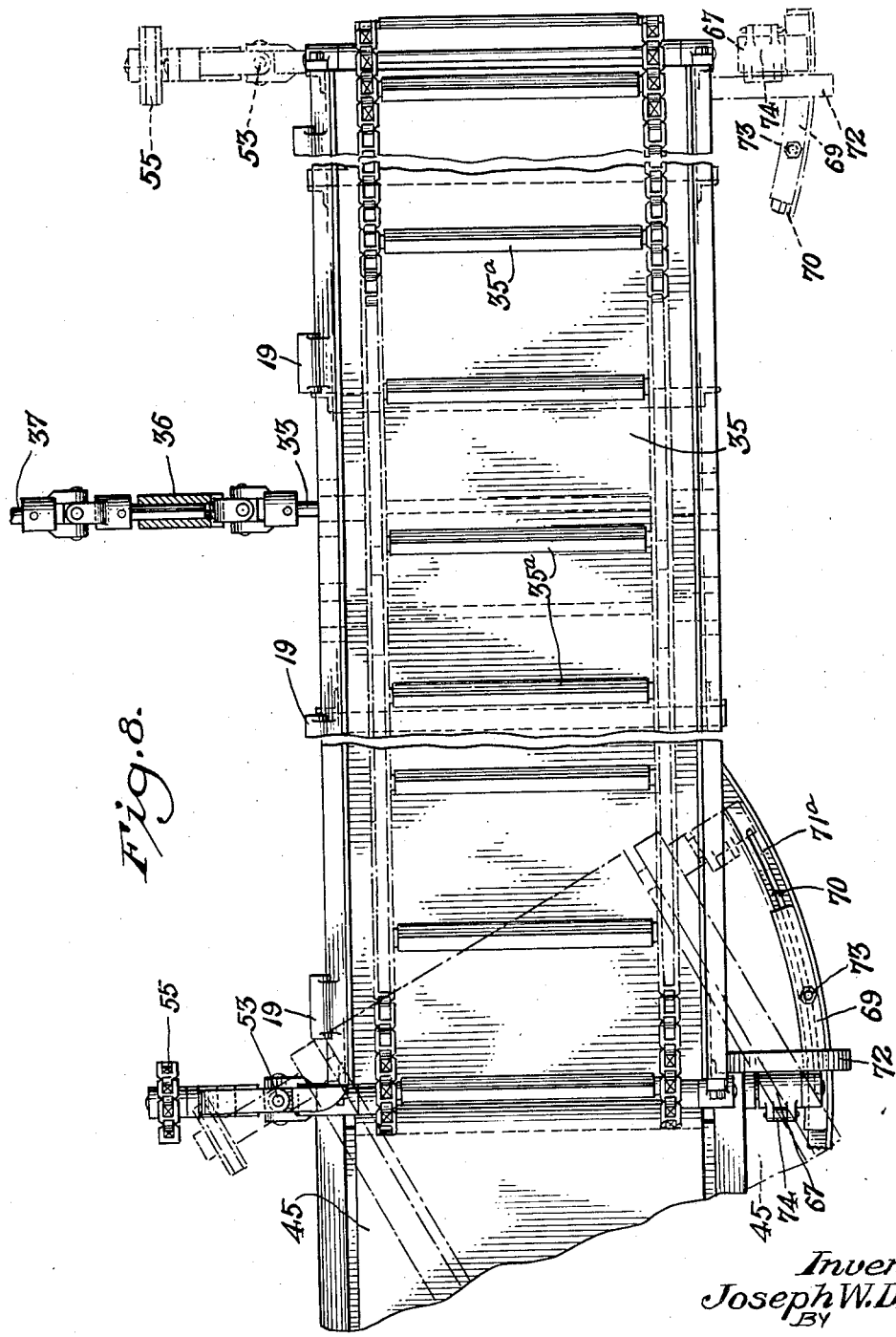
Inventor
Joseph W. Davis
BY
Charles K Woodju
his Agent.

Oct. 11, 1949.                J. W. DAVIS                2,484,689
                    MATERIAL UNLOADING AND CONVEYING
                           MECHANISM FOR TRUCKS
Filed June 16, 1945                                5 Sheets-Sheet 4

Inventor
Joseph W. Davis
BY
Charles K Woodie
his Agent.

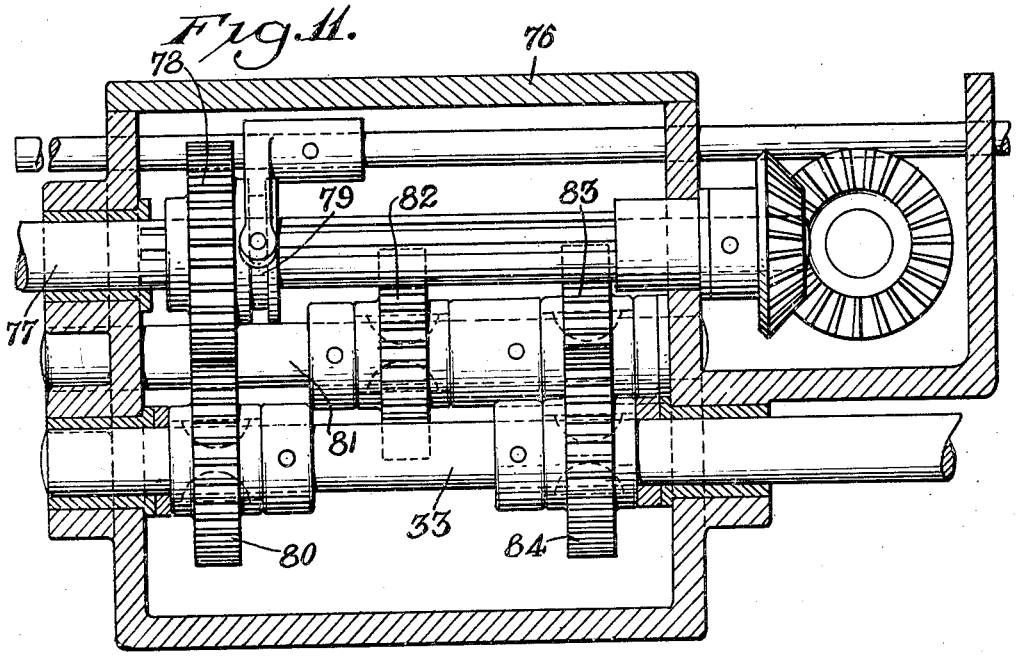
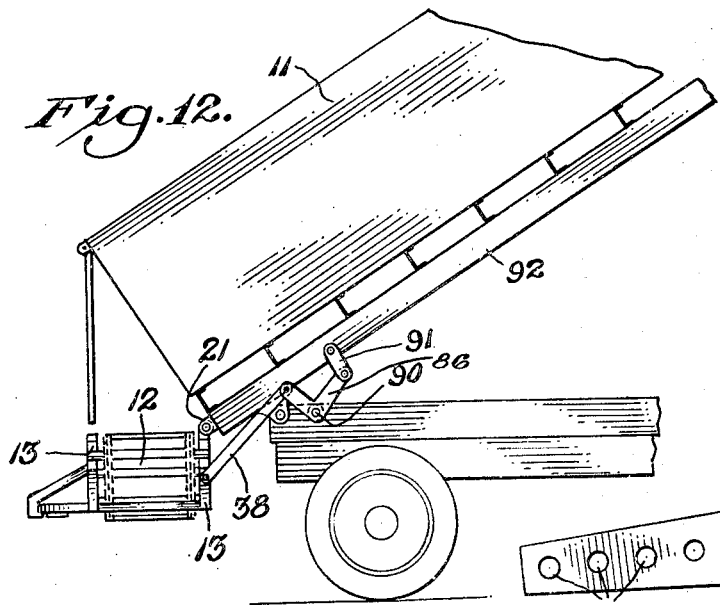
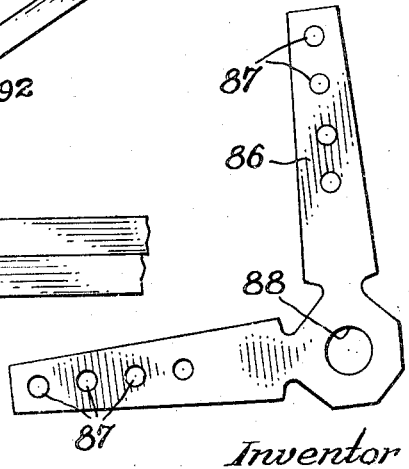

Patented Oct. 11, 1949

2,484,689

UNITED STATES PATENT OFFICE 2,484,689

MATERIAL UNLOADING AND CONVEYING MECHANISM FOR TRUCKS

Joseph W. Davis, Bloomington, Ill., assignor of one-half to Beatrice Davis, Bloomington, Ill.

Application June 16, 1945, Serial No. 599,933

19 Claims. (Cl. 214—83.26)

This invention relates to material unloading and conveying mechanism for trucks and the like, and concerns itself primarily with a conveyor permanently supported across the rear end of the truck so that it will always remain in a horizontal plane even when the truck body is tilted to unloading position, and which can be driven in either of two directions to unload upon either side of truck through the operation of the power plant of the truck.

The invention includes an auxiliary conveyor cooperating with the main conveyor and which can be swung in azimuth to deliver the material where desired and which can also be elevated for delivery purposes if necessary and which auxiliary conveyor is likewise driven by the power plant of the truck through a connection with the driving means of the main conveyor; the auxiliary conveyor being adapted for attachment to either end of the main conveyor unit.

With these and other features of the invention which will be pointed out as the description proceeds, this invention comprises the novel structure and combination of parts hereinafter described and more particularly pointed out and defined in the appended claims.

In the accompanying drawings which illustrate a preferred form of this invention and in which similar reference numerals refer to similar features in the different views:

Fig. 1 is a fragmentary side elevational view of a truck embodying material unloading and conveying mechanism involving this invention;

Fig. 2 is a view similar to Fig. 1 but showing the truck body in tilted and unloading position;

Fig. 3 is a fragmentary rear elevational view of the truck illustrating the auxiliary conveyor in an elevated position, taken upon the line 3—3 of Fig. 2;

Fig. 4 is a top plan view of the main conveyor at the rear end of the truck illustrating the manner in which the auxiliary conveyor can be swung in azimuth, taken upon the line 4—4 of Fig. 3;

Fig. 5 is an enlarged side elevational view of the conveyor unit looking upon the rear of the truck;

Fig. 6 is an end elevational view of the conveying unit with the auxiliary conveyor omitted looking in the direction of the arrows on line 6—6 of Fig. 5;

Fig. 7 is a sectional view taken upon the line 7—7 of Fig. 5 looking in the direction of the arrows;

Fig. 8 is an enlarged top plan view of the main conveyor attached to the rear end of the truck illustrating the manner of attaching the auxiliary unit to either end of the main unit;

Fig. 11 is a sectional view through the reversing gear casing;

Fig. 12 is a fragmentary elevational view somewhat similar to Fig. 2 illustrating a modified form of conveyor levelling means; and Fig. 13 is a plan view of an adjustable levelling element.

Figure 9:
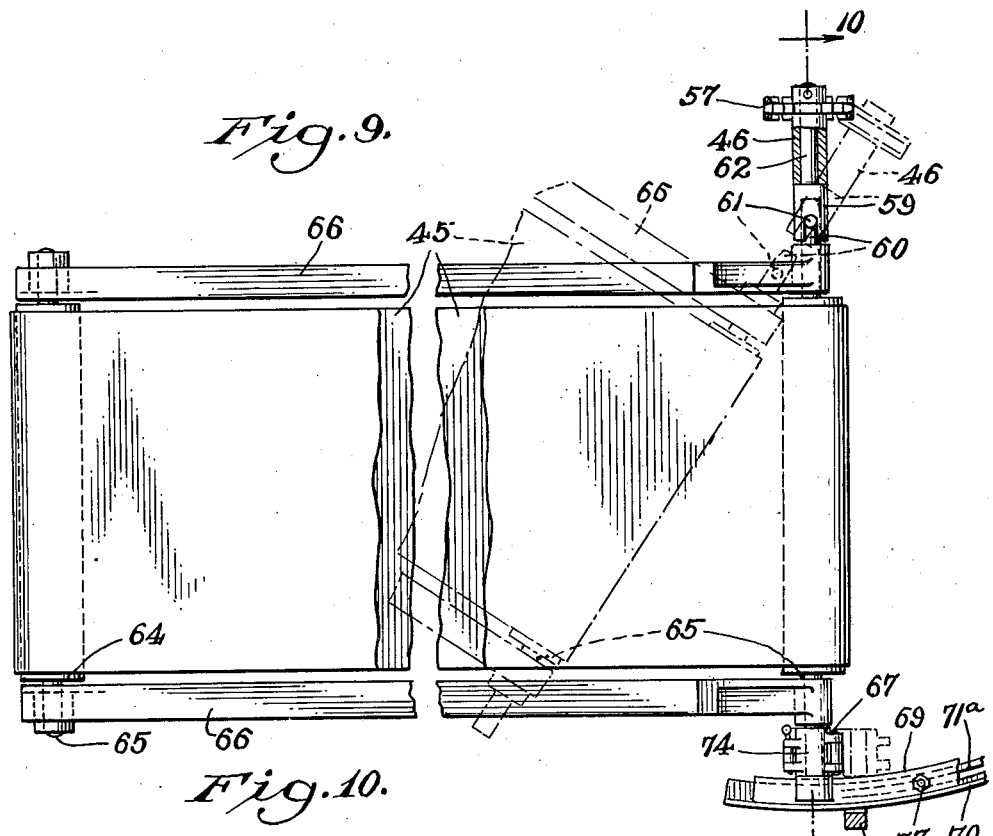
Fig. 9 is a broken top plan view of the auxiliary conveyor further illustrating the manner of mounting the same.

In referring now to the drawing, there is shown a truck which in the present instance is adapted for hauling coal and which has an upwardly tiltable body 11 upon the rear end of which there is secured a transversely extending conveyor unit which is generally denoted by the reference numeral 12. This conveyor unit comprises a frame having end or corner posts 13 and intermediate struts 14 which are connected by angle strips 15 (Figs. 5 and 6) which support the conveyor trough 16. Angle bars 17 which extend longitudinally of the unit are attached to the lower ends of the struts 13 and 14. The upper ends of the struts are longitudinally connected by angle bars 18 between which the conveyor trough 16 is confined. The inner angle member 18 is provided with a plurality of spaced hinged eyelets 19 which are pivotally connected to hinge brackets 20 (Figs. 1 and 2) on the rear cross sill 21 of the truck.

The end struts 13 carry shaft bearings 22 (Fig. 5) in which the head and tail shafts 23 and 24 are respectively journalled that carry the head and tail sprockets 25 and 26. Intermediate the conveyor frame, there are mounted tension idler sprockets 27 upon a shaft 28 journalled in slide bearings 29 mounted upon angle bars 30 connected to the two innermost intermediate struts 14. These slide bearings 29 are adapted to be adjusted by screw rods 31 rotatably anchored to the bearings 29 and threaded in a transverse brace angle iron 31a.

A pair of driving sprockets 32 are secured upon a shaft 33 journalled in bearings 34 secured to the members 17. A conveyor belt 35 is trained over these sprockets and is preferably provided with transverse ribs 35a as shown in Fig. 4. The driving shaft 33 is connected to a flexible shaft portion 36 (Figs. 1 and 8) which in turn is connected to a shaft 37 driven by a reversing transmission operated by power plant of the truck.

The main conveyor unit 12 which is hinged to the rear cross sill 21 of the truck rises and falls with the tilting of the truck. In the position shown in Fig. 1, the conveyor unit is in normal position. When the body of the truck is tilted to dumping position as shown in Fig. 2, the conveyor unit is at a lower elevation, the flexible shaft portion 36 providing for this movement. In order to maintain the conveyor unit in a true horizontal position in all positions of the truck, radius rods 38 pivotally connect the conveyor unit with the stationary frame 39 of the truck. It will be noted that the body of the truck tilts upon an axis 40 (Fig. 2) in the hoist frame 41 and the radius rod pivots on an axis 42 in the stationary frame 39 just below the pivot 40 and in substantially the same vertical plane. Likewise, the hinge axis 44 of the conveyor unit is substantially in the same vertical plane as the pivotal axis 43 of the radius rod 38. As the distances between the pivot axes 43 and 44 and between the axes 40 and 42, are substantially equal, such axes define a parallelogram which will maintain the conveyor unit in a horizontal plane in all positions. But an alternate of leveling mechanism shown in Figs. 12 and 13 may be used.

The main conveyor 35 is adapted to be driven in either direction for unloading upon either side of the truck, as will later more fully appear. The material unloaded is designed to be deposited upon the auxiliary conveyor generally denoted by the reference numeral 45 which may be attached to either end of the main conveyor frame and which may be swung in arcs of about forty-five degrees. To this end, there is secured upon each rear corner strut 13 at the ends of the conveyor frame, a swingable bracket 46 (Figs. 6 and 10) which may be swung from arcs of about forty-five degrees. While the bracket 46 may be swingingly attached to the strut 13 in various ways, as a matter of illustration, a pair of swivel joints 47 are shown. Each swivel joint consists of an arm 48 attached to a strut 13. Each arm having a tenon 49 extending into a mortise 50 in an arm 51 on the bracket 46 and pivoted therein by a pivot 52. It will be noted that the tenons and mortise joints are so arranged that the pivots 52 are in a vertical plane so that the bracket 46 can be swung in azimuth. Of course, it will be apparent that the brackets 46 may be swingably supported by other means.

The invention may embody a swingable bracket 46 with means for supporting and driving an auxiliary conveyor only upon one side of the truck. Such a construction which may be usually sufficient allows unloading only from one lateral direction of the truck. Under certain circumstances, it may be desirable to unload in the other lateral direction of the truck. The invention contemplates provision for such circumstances by duplicating the swingable bracket 46 with its means for supporting and driving the auxiliary conveyor upon both ends of the main conveyor unit. As a result, when it is desired to unload the truck, the auxiliary conveyor can be attached to either end of the main conveyor unit for unloading from the desired side.

Figure 10:
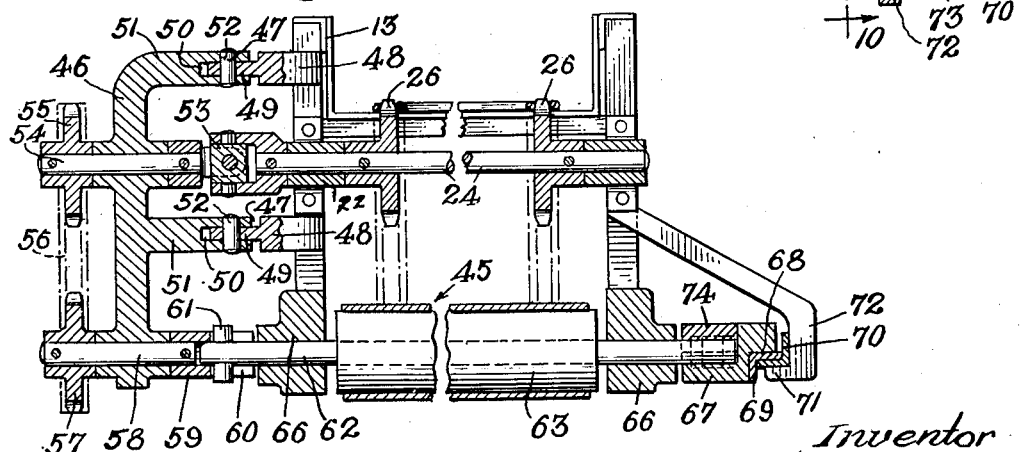
Fig. 10 is a sectional view taken upon the line 10—10 of Fig. 9.

In Fig. 10 is shown the swingable bracket construction for each end of the conveyor unit, but it will be described in connection with the tail sprocket shaft 24; the head sprocket shaft 23 being similar if the swingable bracket 46 is used at each end of the conveyor unit. It will be noted that the conveyor shaft 24 extends through its bearing 22 and that it has a suitable universal joint connection 53 with a stub shaft 54 journalled in the bracket 46. The shaft 54 carries a sprocket wheel 55 which is geared by a sprocket chain 56 to sprocket wheel 57 secured upon a shaft 58 journalled in the lower end of the bracket and extending inwardly with a bearing member 59 secured upon its inner end portion. The bearing 59 has a bifurcation 60 in its free end for receiving a cross pin 61 on the shaft 62 of the head roller 63 of the auxiliary conveyor 45. The auxiliary conveyor comprises a head roller 63 mounted upon shaft 62 and a tail roller 64 mounted upon a shaft 65. The shafts 62 and 65 are supported by parallel side frame members 66. The free end of the head shaft 62 extends through the frame member 66 and carries at its end a lock barrel 67 provided with a rabbet 68 in which an angle member 69 is seated which is adapted to slide over an angle member 70 seated upon a lip 71 on an angular bracket 72 attached to the end strut 13. The angle member 70 which is of arcuate form and attached at its inner end to the frame of the main conveyor as shown in Fig. 8, is provided with a slot 71a for receiving a bolt 73 that slidably clamps the angle members 69 and 70 together. The barrel 67 is provided with a hinge cover 74 which can be snapped and retained over the end portion of shaft 62 which extends into the barrel a little short of the rabbet 68.

Thus the auxiliary conveyor can readily be attached to the conveyor frame or removed therefrom. Likewise, it can be attached to either end of the main conveyor frame. In Fig. 9, the manner of detaching the auxiliary conveyor is shown in dotted lines. It is merely necessary to unclamp the barrel cover 74, lift the shaft 62 therefrom and disengage the pin 61 from the bifurcation 60 which may be done by a swinging movement as indicated in dotted lines in Fig. 9. A reverse operation will attach the auxiliary conveyor to the main conveyor frame.

When the auxiliary conveyor is in place, it can be swung through an angle of about 45 degrees as shown in Fig. 8 by loosening the nut 73 and swinging the bracket 46; the barrel 67 sliding over the arcuate support 70.

When the auxiliary conveyor is mounted upon the left hand end of the main conveyor frame, it is adapted to be driven through normal operation of the power plant, but when the auxiliary conveyor is mounted upon the right hand end of the main conveyor, it is necessary to employ reversing gears such as shown in Fig. 11. In Fig. 11, there is shown a transmission casing 76 which is adapted to be carried by the truck. The motor shaft 77 is journalled in this casing and carries a slidable gear 78 having a gear shift lever yoke 79. The gear 78 meshes with a gear 80 keyed upon the conveyor driving shaft 33 for rotating the same in one direction.

To rotate shaft 33 in the other direction, there is provided a third shaft 81 having a gear 82 thereon which is adapted to be engaged by gear 78 when the latter is shifted sufficiently to the right. Shafts 81 and 33 are geared together by gears 83 and 84 respectively secured thereto. As a result when shaft 81 drives shaft 33 the latter will have a reversed rotation.

In order to adapt the main conveyor unit to different kinds of trucks having different lifts, such a construction as shown in Figs. 12 and 13 may be used to attach the main conveyor frame to the truck. In this form of attachment, an L-shaped member 86 having a series of holes 87 in each of its arms with a pivot aperture 88 at the apex of the arms.

The L-shaped member 86 is pivoted at its apex to the stationary frame of the truck as indicated at 90 with one arm thereof pivotally connected to the aforementioned radius rod 38 through any of the holes 87 and the other arm pivotally connected through one of its holes with a link 91 pivoted to the hoist frame 92 of the body of the truck. Any desired number of such connections may be used. Such connections will also maintain the main conveyor frame in horizontal position in all positions of the truck body just as the first connections set forth.

It will be appreciated that according to this invention, the main conveyor is permanently attached to the truck and is driven by the power plant of the truck and no special motor is required. The auxiliary conveyor is however adapted to be attached at the unloading location of the truck and as it is driven from the main conveyor, no special motor is needed therefor. Within the scope of this invention, it is also possible to unload the truck from either side by attaching the auxiliary conveyor to the desired end of the main conveyor and reversing the main conveyor drive if necessary, as previously explained.

This invention will obviously expedite the unloading of material such as coal from a truck and save considerable time and expense. At the same time, the material can be more approximately deposited where it is desired through the use of suitable auxiliary conveyors.

I am aware that many changes may be made and various details of construction varied without departing from the principles of this invention so I do not propose limiting the patent granted thereon otherwise than necessitated by the appended claims.

I claim as my invention:

1. In a material hauling truck having a power plant and a tiltable body, a conveyor having a frame hinged transversely to the rear of the tiltable body, means connecting said conveyor with said body and truck for automatically maintaining said conveyor in continuously horizontal position in all positions of said body and drive means for said conveyor driven by said power plant.

2. In a material hauling truck having a power plant and a tiltable body, a conveyor having a frame hinged transversely to the rear of the body, means connecting said conveyor frame with a stationary part of said truck, self leveling means for maintaining said conveyor in a horizontal position in all positions of said body and flexible driving means connecting said conveyor and power plant.

3. In a material hauling truck having a power plant and a tiltable body, a conveyor having a frame connected transversely at the discharge end of the body, means cooperative between said conveyor frame, said body and a stationary part of said truck for continuously maintaining said conveyor in a horizontal position in all positions of the truck, and flexible driving means for operating said conveyor from said power plant, including reversing gearing for driving said conveyor in either direction.

4. In a material hauling truck having a tiltable body, and a power plant, a main conveyor having a frame hinged transversely to the rear of the body, means for maintaining said conveyor in a horizontal position during the tilting movements of said body, driving means connecting said conveyor with said power plant, an auxiliary conveyor removably attached to one end of said main conveyor and swingable in azimuth and a driving connection between said main conveyor and auxiliary conveyor.

5. In a material hauling truck having a tiltable body, a main conveyor having a frame hinged transversely to the rear of said body, means connecting said conveyor frame and truck for maintaining the conveyor in a horizontal position during all tilting movements of the body portion, means carried by said truck for operating said conveyor and an auxiliary conveyor adjacent said main conveyor and swingable in azimuth and means for driving said auxiliary conveyor from the main conveyor.

6. In a material hauling truck having a power plant and a tiltable body, a main conveyor having a frame hinged transversely to the rear of the body, means connecting said conveyor and truck for maintaining said conveyor in a horizontal position during the tilting movements of the body, means for driving said conveyor from said power plant, a swingable bracket attached to the main conveyor frame and having means for supporting an auxiliary conveyor, an auxiliary conveyor removably attached to said last mentioned means and driving means carried by said bracket and having connections with said main conveyor and said auxiliary conveyor for driving the latter.

7. In a material hauling truck having a tiltable body and a power plant, a main conveyor having a frame hinged to the rear of the body, pivoted means connecting said conveyor frame and truck for maintaining said conveyor in a horizontal position in the tilted position of the truck, a swingable bracket frame connected to an end of said conveyor frame, an auxiliary conveyor removably mounted upon said bracket frame and swingable to different angular relations with said truck, means for driving said main conveyor from said power plant, and driving means carried by said swingable bracket frame and having driving connections with said main conveyor and said auxiliary conveyor for operating the latter.

8. In a material hauling truck having a power plant and a tiltable body, a main conveyor having a frame connected transversely to the rear end of the body, means connecting said conveyor frame and truck for maintaining said conveyor in a horizontal position during the tilting movement of said body, reversible driving means connecting said main conveyor and power plant, swingable means carried by the ends of said conveyor frame for removably supporting an auxiliary conveyor at either end of said frame and driving means carried by said swingable means adapted for operating an auxiliary conveyor.

9. In a material hauling truck having a tiltable body and a power plant, a main conveyor having a frame hinged to the rear of said tiltable body, pivoted means connecting said conveyor frame and truck for maintaining said conveyor in a horizontal position in all positions of said tiltable body, flexible driving means connecting said power plant and conveyor, swingable means carried by an end of said main frame and adapted for supporting an auxiliary conveyor and driving means carried by said swingable means and having driving connections with said main conveyor and said auxiliary conveyor adapted for operating said auxiliary conveyor during the operation of said main conveyor.

10. In a material hauling truck having a tiltable body and a power plant, a main conveyor having a frame connected transversely to the rear of said body, driving means for connecting said conveyor with said power plant, said conveyor frame having an upright at one end, a vertical bracket having swivel connections with said bracket for swinging movements in an arc, a driven shaft carried by said bracket and having a clutch bearing at its inner end adapted for receiving one end of an auxiliary conveyor shaft, an arcuate support carried by said main conveyor frame opposite said bracket, a bearing slidably mounted on said bracket and having an entrance adapted for receiving the other end of the auxiliary conveyor shaft, and flexible driving means extending from said main conveyor through said bracket and geared to said driven shaft.

11. In a material hauling truck having a power plant and a tiltable body, a transverse conveyor having a frame carried by the rear end of said body, driving means extending from said power plant to said conveyor for operating the same, opposed movable supports carried by one end of said frame, opposed bearings one carried by each movable support, an auxiliary conveyor having a shaft adapted to be mounted in said bearings, and driving means carried by one movable support, said driving means having a flexible driving connection with said main conveyor and a driving connection with one of said bearings for operating said auxiliary conveyor.

12. In a material hauling truck having a tiltable body and a power plant, a main conveyor having a frame connected transversely to the rear end of said body, means connecting said conveyor and body for maintaining the conveyor in a continuously horizontal position during the tilting movements of said body, a driving shaft connected to said conveyor and having a reversible connection with said power plant for driving said conveyor in either direction, an auxiliary conveyor, movable supporting means at each end of the main conveyor frame for removably supporting said auxiliary conveyor, and driving means carried by said supports and having flexible driving relation with the main conveyor and adapted for operating the auxiliary conveyor.

13. In a material hauling truck having a tiltable body and a power plant, a conveyor having a frame hinged to the rear end of said body, means connecting said conveyor frame and truck for maintaining said conveyor in a horizontal plane in all positions of said body, driving means connecting said conveyor and power plant, opposed movable supports on one end of said conveyor frame and adapted for movements in arcs, opposed bearings, one carried by each support, an auxiliary conveyor having a shaft removably mounted in said bearings and driving means carried by one support, said driving means having a flexible connection with said main conveyor and a connection with one bearing upon its support.

14. In a material hauling truck having a tiltable body and a power plant, a conveyor having a frame transversely hinged to the rear end of said body, a member having an apex pivoted to a stationary part of the truck and having arms extending in diverging relation from said apex, each arm having a series of apertures, a radius link connected with an aperture in one arm and pivoted to said conveyor frame and a link pivotally connecting the other arm with the tiltable body, and driving means having a driving connection with said power plant and said conveyor for operating the latter.

15. In material handling apparatus, a tiltable body having a discharge end, a conveyor disposed below said discharge end, means cooperative between said conveyor, said tiltable body and a fixed portion for automatically maintaining said conveyor in continuously horizontal position with respect to said body and drive means for said conveyor.

16. In a material hauling truck having a frame, a normally horizontally extending body having a rear discharge end, means for tilting said body backwardly longitudinally of said frame, a conveyor disposed below said body discharge end, means cooperative between said frame, said body and said conveyor for automatically maintaining said conveyor in horizontal relation in all operative positions thereof, and means carried by said truck for operating said conveyor.

17. In a material hauling truck, the combination of elements as set forth in claim 16 including an auxiliary conveyor into which the first-mentioned conveyor may discharge.

18. In a material hauling truck, the combination of elements as set forth in claim 16 including an auxiliary conveyor into which the first-mentioned conveyor may discharge, and means whereby said auxiliary conveyor may be swung horizontally with respect to said first-mentioned conveyor.

19. In a material hauling truck, the combination of elements as set forth in claim 16 including an auxiliary conveyor into which the first-mentioned conveyor may discharge, and means whereby said auxiliary conveyor may be swung horizontally and the discharge end thereof may be elevated or lowered.

JOSEPH W. DAVIS.

REFERENCES CITED

The following references are of record in the file of this patent:

UNITED STATES PATENTS

| Number | Name | Date |
|---|---|---|
| 837,170 | Wishon | Nov. 27, 1906 |
| 1,553,597 | Clark | Sept. 15, 1925 |
| 2,093,300 | Adams et al. | Sept. 14, 1937 |
| 2,102,432 | Nesseth | Dec. 14, 1937 |
| 2,107,682 | Wall | Feb. 8, 1938 |
| 2,293,486 | Barrett | Aug. 18, 1942 |
| 2,325,492 | Erickson | July 27, 1943 |
| 2,367,784 | Knoizen et al. | Jan. 23, 1945 |
| 2,390,268 | Penney | Dec. 4, 1945 |
| 2,394,006 | Osgood | Feb. 5, 1946 |